(12) United States Patent
Steinruecken et al.

(10) Patent No.: US 7,095,238 B2
(45) Date of Patent: Aug. 22, 2006

(54) DIAGNOSTIC METHOD FOR A SENSOR

(75) Inventors: Heinrich Steinruecken, Ludwigsburg (DE); Klaus Walter, Bietigheim-Bissingen (DE); Rasmus Rettig, Gerlingen (DE); Klemens Gintner, Ettingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/532,695

(22) PCT Filed: Sep. 12, 2003

(86) PCT No.: PCT/DE03/03024

§ 371 (c)(1),
(2), (4) Date: Apr. 26, 2005

(87) PCT Pub. No.: WO2004/070319

PCT Pub. Date: Aug. 19, 2004

(65) Prior Publication Data

US 2006/0152226 A1 Jul. 13, 2006

(30) Foreign Application Priority Data

Feb. 7, 2003 (DE) .............................. 103 05 257
Feb. 12, 2003 (DE) .............................. 103 05 940

(51) Int. Cl.
*G01R 31/00* (2006.01)

(52) U.S. Cl. ..................................... 324/509; 324/503
(58) Field of Classification Search ................ 324/503, 324/509
See application file for complete search history.

(56) References Cited

U.S. PATENT DOCUMENTS

| 6,215,297 | B1 | 4/2001 | Bleckmann et al. | ........ 324/166 |
| 6,456,085 | B1 | 9/2002 | Dietl et al. | .................. 324/509 |
| 6,760,681 | B1 * | 7/2004 | Takahashi et al. | .......... 702/145 |
| 6,814,053 | B1 * | 11/2004 | Hawkins et al. | ............ 123/351 |
| 2004/0066183 | A1 | 4/2004 | Lohberg et al. | |

FOREIGN PATENT DOCUMENTS

| DE | 101 46 949 A1 | 6/2002 |
| EP | 0 615 111 A1 | 9/1994 |
| GB | 2 119 097 A | 11/1983 |
| GB | 2 255 410 A | 11/1992 |

* cited by examiner

*Primary Examiner*—Walter Benson
(74) *Attorney, Agent, or Firm*—Michael J. Striker

(57) ABSTRACT

In a method for diagnosis of a sensor in a motor vehicle having an internal combustion engine, during operation of the motor vehicle, an output signal of the sensor is monitored for whether a maximum value of the output signal undershoots a first threshold value and/or a minimum value of the output signal overshoots a second threshold value. In that case a signal is forwarded to a controller that signals to the controller that the sensor, upon restarting of the motor vehicle, might be furnishing incorrect data.

12 Claims, 2 Drawing Sheets

DIAGNOSTIC METHOD FOR A SENSOR

BACKGROUND OF THE INVENTION

The present invention relates to a method for diagnosis of a sensor, for instance in a motor vehicle having an internal combustion engine. A sensor of this kind that is to be diagnosed may for instance be a phase sensor on the camshaft of the motor vehicle. Depending on whether a detected variable is above or below a defined threshold value, such a sensor furnishes a corresponding output signal.

Such a sensor is for instance a sensor that reacts to magnetic fields, by which the speed of rotation and/or the position of a transducer wheel that has teeth can be ascertained. A sensor of this kind is constructed and arranged such that the transducer wheel, whose position or rotary speed is to be ascertained, passes between the sensor and a magnet, causing the sensor to record a weak magnetic field when one tooth of the transducer wheel is just then diametrically opposite it, and to record a strong magnetic field when no tooth of the transducer wheel (that is, a gap) is just then diametrically opposite it (or vice versa). Such a sensor can operate inductively or be based on Hall or XMR technology.

FIG. 2 schematically shows one such arrangement with a transducer. In it, R indicates the transducer wheel, G indicates the magnet and the transducer containing the sensor, and W indicates the element on which the transducer wheel R is mounted and whose rotary speed and/or position is to be ascertained; the element W is for instance the crankshaft or the camshaft of an internal combustion engine.

For the sake of completeness it should be noted that the arrangement shown in FIG. 2 is shown highly schematically. In particular, in practice, the transducer wheel R may have more teeth, or differently shaped teeth.

The magnetic field recorded by the sensor is converted in the sensor into a current or a voltage, whose magnitude is directly or indirectly proportional to the magnitude of the magnetic field.

The sensor on which the method for diagnosis according to the invention is based outputs a digital signal. To that end, it compares the electrical variable, into which the recorded magnetic field was converted, with a threshold value, and it outputs a signal at a high level if and as long as the electrical variable is higher than the threshold value, and it outputs a signal at a low level if and as long as the electrical variable is less than the threshold value (or vice versa).

It should be clear and requires no further explanation that such a sensor outputs the output signal expected from it only if the threshold value has been correctly defined.

In practice, however, it is known that the magnitude of the magnetic field recorded by the sensor and the electrical variable into which it is converted is dependent on various factors, such as the temperature, the location of the sensor, the degree of soiling, aging, and so forth so that an originally optimally defined threshold value is suddenly no longer optimal or is even entirely unusable.

For this reason, self-calibrating sensors are often used, which are capable of automatically adapting the threshold value to given conditions. This can be done for instance in that during normal operations the sensors ascertain the range within which the variable to be compared with the threshold value varies, and then change the threshold value in such a way that it is located for instance precisely in the middle of this range.

However, this kind of self-calibration is not always successful. Specifically, it can be done only with the transducer wheel rotating, since only then can the range within which the variable to be compared with the threshold value varies be ascertained.

On the other hand, it is sometimes important, immediately after the sensor and/or the arrangement containing it has been put into operation, that is, while the transducer wheel is still at a standstill, to obtain information about the position or the rotary speed of the element to be monitored.

This is the case for instance if the sensor is used to monitor the position and/or the rotary speed of the camshaft of an internal combustion engine. In that case, it is desirable to obtain information about the position of the camshaft even before the engine is started. This information, or more precisely the information as to whether the sensor is just then diametrically opposite a transducer wheel tooth or a gap, is needed to enable optimal starting of the engine.

Since the sensor cannot calibrate if and as long as the camshaft is at a standstill, however, it cannot be assumed with certainty that the information that the sensor provides about the camshaft position is correct.

Equivalent problems exist in all other sensors whose output signal depends on whether a variable detected is above or below a threshold value.

SUMMARY OF THE INVENTION

It is therefore the object of the present invention to disclose a method for diagnosis of a sensor in a motor vehicle having an internal combustion engine that the use of output signals of the sensor that do not reflect prevailing conditions is prevented. The further object of the invention is to disclose a sensor with the appropriate functionality.

This object is attained according to the invention by the method defined by claim 1 for diagnosis of a sensor in a motor vehicle with an internal combustion engine. This object is also attained by a sensor whose output signal depends on whether a detected variable is above or below a defined threshold value; during operation, the sensor monitors whether proper definition of the signal to be output can be assured by means of a threshold value employed upon startup of the sensor, and the sensor then, if it finds that this is not the case, outputs information representing this situation.

The sensor according to the invention is distinguished by the fact that during operation, the sensor monitors whether proper definition of the signal to be output can be assured by means of a threshold value employed upon startup of the sensor, and that the sensor, if it finds that this is not the case, outputs information representing this situation.

As a result, the sensor can inform the device that uses the signals it outputs that the signal output by it upon the next startup might not, or with certainty will not, reflect prevailing conditions. It can thus be prevented that the device that uses the sensor output signals will operate as a function of information that does not reflect prevailing conditions.

Advantageous refinements of the invention can be learned from the dependent claims, the ensuing description, and the drawings.

BRIEF DESCRIPTION OF THE DRAWINGS

The invention will be described in further detail below in terms of an exemplary embodiment in conjunction with the drawings.

Shown are:

FIG. 1B, the output signal that the sensor normally outputs upon the detection of the course shown in FIG. 1a;

DETAILED DESCRIPTION OF THE PREFERRED EMBODIMENTS

The sensor described below is an rpm sensor for detecting the rpm or the position of the camshaft of an internal combustion engine. The position of the camshaft means a so-called phase sensor, which ascertains which phase the crankshaft of the engine is located in. The sensor is more precisely a sensor that reacts to magnetic fields, by which the speed of rotation and/or the position of a transducer wheel that has teeth and secured to the camshaft and thus also the position of the camshaft that carries the transducer wheel can be ascertained. This sensor is constructed and arranged such that the transducer wheel, whose position or rotary speed is to be ascertained, passes between the sensor and a magnet, causing the sensor to record a weak magnetic field when one tooth of the transducer wheel is just then diametrically opposite it, and to record a strong magnetic field when no tooth of the transducer wheel (that is, a gap) is just then diametrically opposite it (or vice versa).

The magnetic field recorded by the sensor is converted in the sensor into a current or a voltage, whose magnitude is directly or indirectly proportional to the magnitude of the magnetic field. For the further observation below, it is assumed that the magnetic field is converted into a voltage. However, the following discussion applies accordingly to the conversion into a current.

Figure 1A:
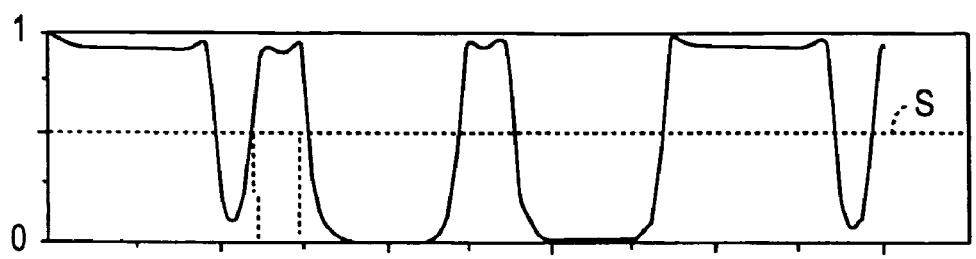
FIG. 1A, the course over time of a variable detected by the sensor described below.

The course over time of the voltage resulting from the conversion is shown as an example in FIG. 1a. The voltage course shown is shown in standardized form, with the minimum voltage assigned the value of 0, and the maximum voltage the value of 1.

The sensor considered here outputs a digital sensor. To that end, it compares the electrical variable into which the recorded magnetic field was converted with a threshold value, and it outputs a signal at a high level if and as long as the electrical variable is higher than the threshold value, and it outputs a signal at a low level if and as long as the electrical variable is less than the threshold value (or vice versa).

Figure 1B:
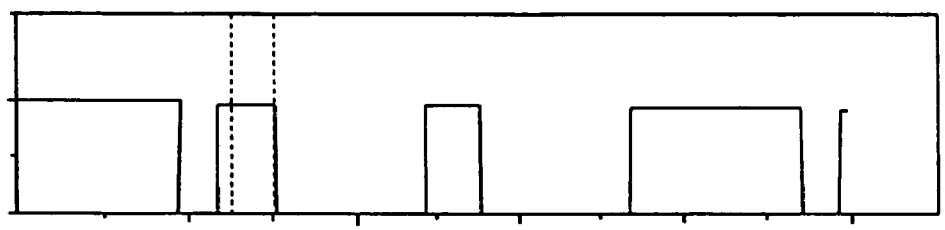

If a threshold value, marked S in FIG. 1A, located precisely in the middle between the maximum incident voltage and the minimum incident voltage, is used for the conversion, done as mentioned, of the voltage shown in FIG. 1A into the signal to be output by the sensor, the result is the voltage course shown in FIG. 1B.

The signal shown in FIG. 1B is output by the sensor and evaluated by the device to which the sensor is connected. In the example here, it is assumed that only the leading edge of each of the pulses is of interest. The device that evaluates the sensor signal is as a rule an evaluation circuit, which is integrated directly with the sensor, or alternatively it is a controller, which controls the operation of the engine (engine control unit).

As has already been noted at the outset, the voltage course shown in FIG. 1A can vary as a function of various factors, such as the temperature, the location of the sensor, the degree of soiling, aging, and so forth. In particular, it can happen that the minimum voltage rises and/or the maximum voltage drops, or both the minimum voltage and the maximum voltage may rise or drop. As a consequence, the threshold value is suddenly no longer located in the middle between the minimum and maximum voltage, so that earlier or later it may happen that under otherwise identical conditions, when the altered analog signal is converted into a digital signal, a different result will be obtained from the signal shown in FIG. 1B.

This situation is taken into account in the example in question by embodying the sensor employed as a self-calibrating sensor, which uses the threshold value stored in memory in the sensor only immediately after the startup of the system, and as soon as possible it ascertains a more suitable threshold value and uses it instead of the threshold value stored in memory in the sensor.

In this respect it would theoretically be possible to provide a nonvolatile memory in the sensor, in which a threshold value most recently present directly before the engine was shut off is stored and that can be used the next time it is started up. However, this variant is commercially hardly feasible for both technical and cost reasons, so that generally a fixedly predefined threshold value stored in memory in the sensor must be used.

Ascertaining the optimal threshold value during engine operation can be done for instance by ascertaining the mean value between the maximum voltage and the minimum voltage of the voltage course shown in FIG. 1A, or the voltage course altered relative to it, and using this mean value as the threshold value.

The sensor in question here furthermore has the special feature that during operation it monitors whether, by means of the threshold value used upon startup of the sensor, proper definition of the output signal can be assured, and that if the sensor finds that this is not the case, it signals this situation to the device to which it is connected. Thus in this case, it will transmit a signal accordingly to the engine control unit. The signalling is done in such a way that this additional information is superimposed without loss on the information to be primarily transmitted. For a signal in which the primary information comprises the chronological position of the leading edges, this can be done by superposition on the trailing edges. The leading edges continue to be transmitted as in normal operation and thus assure the ongoing function of the system.

By this means, it can be prevented that the device that operates as a function of the sensor will work with possibly wrong sensor signals the next time the system is started up. In other words, in the event that the deviation between the threshold value stored in memory in the sensor and the threshold value corrected in ongoing operation is too great, a signal is sent to the engine control unit and stored in a permanent memory of the engine control unit. On the basis of this stored information, the engine control unit thereupon indicates that the applicable sensor, such as the phase sensor on the camshaft of the engine, is either not available or is only limitedly available upon a restart. The engine control unit can thereupon perform starting of the engine on the basis of alternative sensor variables, or on the basis of performance graph variables stored in memory. As a rule, this involves a so-called emergency operation functionality, which is utilized in this case to perform starting of the engine. Once the engine has been started and the camshaft has thus been put into motion, a calibration operation of the sensor can be begun, and after the sensor calibration is concluded, the output signals furnished by the sensor can be used for the engine controller.

The fact that the threshold value used upon startup of the sensor cannot assure proper definition of the sensor output signal is signaled by the sensor in question here by way of the terminals, by way of which it outputs the signal that represents the variable detected and that is shown as an example in FIG. 1B. That is, in the invention no additional triggering lines for transmitting the error signal are needed; instead, the already available connection lines of the sensor can be used as described below for transmitting the signal to the engine control unit.

In the example in question, this is done by making the duration of the pulses in the signal to be output (the signal of FIG. 1B) so short that they cannot originate at a tooth of the transducer wheel moving past the sensor, or at a gap of the transducer wheel moving past the sensor. This can be done by simple plausibility checking in the control unit.

Figure 1C:
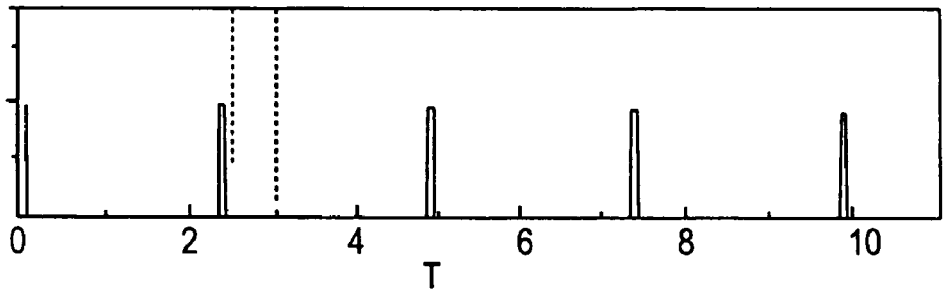
FIG. 1C, the output signal that the sensor outputs if it has found that, in the use of a threshold value used upon startup, it cannot be assured that the sensor output signal reflects the prevailing conditions.
Figure 2:
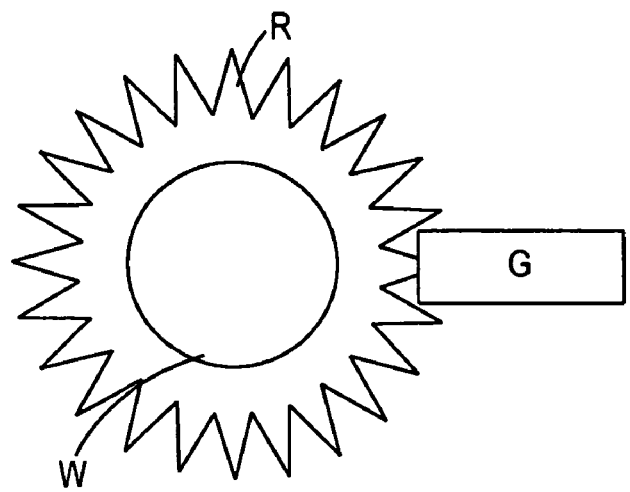
FIG. 2, an arrangement containing the sensor described below.

The course over time of such a course is shown in FIG. 1C. The signal shown in FIG. 1C is the signal shown in FIG. 1B in the case where the sensor has ascertained that proper definition of the sensor output signal cannot be assured by the threshold value used upon startup of the sensor.

The pulses contained in the signals in FIGS. 1B and 1C have the leading edges at precisely the same points and do not differ from one another in this respect.

Since the device (engine control unit) that evaluates the sensor signals, in the example in question, operates only as a function of the leading edges of the pulses contained in the sensor signals, this device, on receiving the signal shown in FIG. 1C, can operate exactly the same as if it were to be provided with the signal shown in FIG. 1B.

The pulses contained in the signal of 1C, however, are very much shorter than is the case for the signal of 1B. They are so short that they cannot be due to the passage of a transducer wheel tooth or a transducer wheel gap past the sensor. From the extraordinary length of the pulses, the evaluation device can recognize that proper definition of the sensor output signal cannot be assured by the threshold value used upon startup of the sensor. The signal transmission employed in FIG. 1C involves in practical terms an encoding of the signal of FIG. 1B.

As an alternative to the described encoding in accordance with FIG. 1C, the two following encoding variants may for instance be employed:

If pulse width modulated protocols, which already transmit additional information anyway, are employed, then a particular pulse width may be employed.

For Manchester-encoded 3-level protocols, the encoding can be done for instance by means of a certain bit.

How the evaluation device reacts to the forwarding of a correspondingly encoded signal depends on the individual case. It should be clear that the most various possibilities exist for this purpose. In the example in question, the evaluation device reacts by storing the situation imparted to it in a nonvolatile memory and ignores the signals delivered to it by the sensor upon the next startup. In the example in question, this is possible without major problems, because the position of the crankshaft is also ascertained, and from the crankshaft position the camshaft position can also be ascertained. Although ascertaining the camshaft position in this way is not as precise as ascertaining the camshaft position using a sensor provided on the camshaft, nevertheless it is precise enough to enable starting the engine. This involves a so-called emergency operation functionality.

After the engine has started, the camshaft rotates, so that the sensor that detects the camshaft position can now calibrate itself and can ascertain and use an optimal threshold value. As soon as this has been done, the output signals of the sensor can be used without limitation.

For the sake of completeness, it should be noted that the sensor may also be any arbitrary other sensor whose output signal depends on whether a variable detected is above or below a threshold value. The measured signal ascertained during operation is used by comparison with set-point values, in order to make a prediction about a state in the future, and this is already forwarded during operation by outputting additional information.

The special features of the sensor described above may also prove advantageous even in a non-self-calibrating sensor.

It should also be noted that the optimal threshold value need not be located in the middle between the maximum and the minimum input variable; depending on the application, it may be necessary for the threshold value to be located more or less far above or below the mean value.

Finally, there is also no absolute necessity that the threshold value used upon startup of the sensor be stored in memory in the sensor; this threshold value may instead be delivered to the sensor upon startup from somewhere else.

By means of the sensor described, it is possible regardless of the details of the practical embodiment to prevent sensor output signals that may not reflect prevailing conditions from being used.

Figure 3:
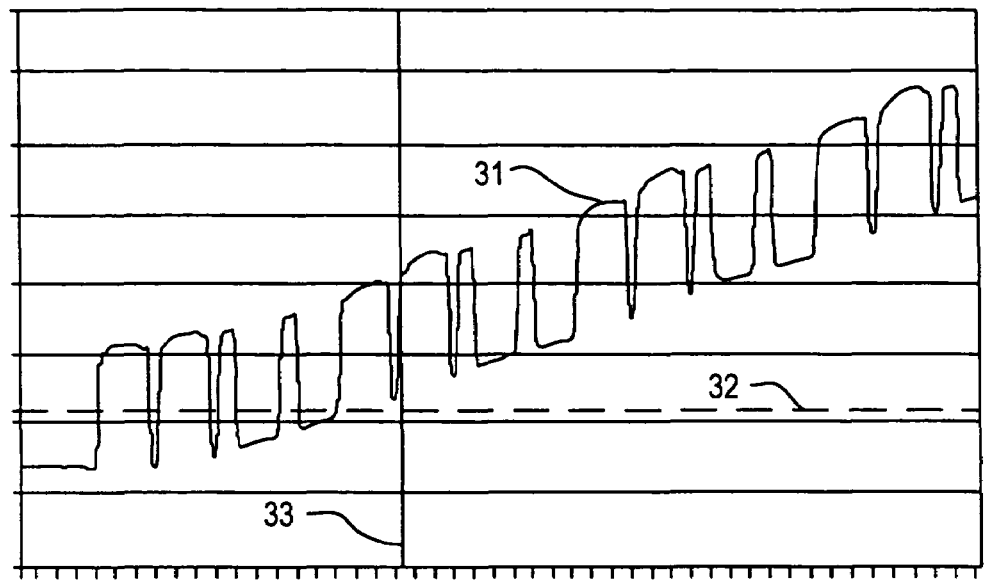
FIG. 3, an illustration showing the monitoring of the overshooting of the threshold value.

FIG. 3 illustrates the fluctuations in a sensor output signal 31 in a so-called drift situation. Over the course of time, the maximum and minimum output values of the sensor drift away from the original values. In the illustration of FIG. 3, the horizontal line is a time axis and the vertical line shows the amplitude of the sensor output signal. The dashed line 32 represents a threshold value stored permanently in the sensor. The vertical line 33 represents the instant when it is possible to ascertain with certainty that a minimum value of the sensor output signal 31 has overshot the threshold value, so that reliable function when the sensor is switched on is no longer assured. This is the instant at which signalling to the engine control unit, or generally the controller, that the sensor might furnish incorrect data upon a restart of the motor vehicle is done. This would for example also be the case if the sensor signal drops so far that the maximum values of the sensor signal are below the threshold value. In general, two different threshold values may also be determined for the minimum and maximum values of the sensor signal, respectively.

In other words, if the minimum or maximum values of the sensor signal drift away so far that a threshold value is overshot or undershot, then it must be assumed that upon a restart of the motor vehicle the sensor will with high probability not furnish reliable output signals and will be available only once calibration has been done. Information indicating this is stored in a nonvolatile memory of the engine control unit and can be called up by the control unit in a restart situation.

If during further operation of the engine or the sensor it is found that the output signals of the sensor are again located in a range which allows evaluation after a restart, then any input that may have been made into the engine control unit memory can be reset.

In conjunction with this invention, a clear distinction must be made between the threshold value stored permanently in the sensor, which threshold value is used immediately after starting of the engine, and the threshold value which results from ongoing calibration during engine operation. The threshold value that results from ongoing calibration during engine operation may for instance be stored in a volatile memory of the sensor.

Figure 4:
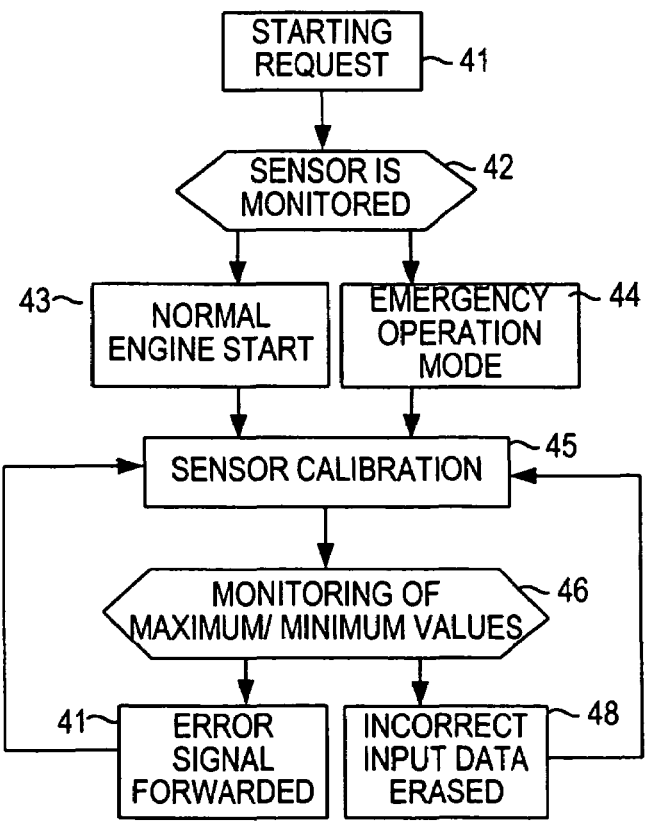
FIG. 4 shows an exemplary embodiment of a method according to the invention for diagnosis of a sensor in a motor vehicle with an internal combustion engine.

FIG. 4 shows a method according to the invention for diagnosis of a sensor in a motor vehicle with an internal combustion engine. The method begins at a step 41 with a starting request, for instance as a result of the fact that the motor vehicle driver actuates the ignition key. In the next step 42 it is monitored whether the sensor can be used for controlling the engine. This is done by reading out the appropriate information from a nonvolatile memory of the engine control unit. If it is certain that the sensor or the sensor output signals can be used, then in step 43 normal starting of the engine is done, using the sensor data. If it is found that the sensor data should not be used, then a skip to step 44 is made, where recourse is had to an emergency operation functionality. For instance, as already described above, the crankshaft angle sensor is used to determine the position of the camshaft. In step 45, which follows both step 43 and step 44, the calibration of the sensor is done. Here, minimum and maximum values are detected, and the threshold value is set to the mean value. In step 46, it is monitored whether the measured minimum and maximum values fail to meet the threshold criterion already described above. If they do, then in step 47 the forwarding according to the invention of an error signal to the engine control unit is effected. This information is stored in the engine control unit in a nonvolatile memory and is available for the next starting event. If it is ascertained in step 56 that no threshold criterion has failed to be met, then in step 48 any incorrect input present in the nonvolatile memory of the control unit is erased. Following steps 47 and 48, the method is continued with step 45. This loop is repeated until such time as the engine is deactivated.

The invention claimed is:

1. A method for diagnosis of a sensor in a motor vehicle having an internal combustion engine, comprising the following steps:

during operation of the motor vehicle, monitoring an output signal of the sensor for whether a maximum value of the output signal undershoots a first threshold value and/or a minimum value of the output signal overshoots a second threshold value;

forwarding a signal to a controller that signals to the controller that the sensor, upon restarting of the motor vehicle, might be furnishing incorrect data if the maximum value of the output signal undershoots the first threshold value and/or the minimum value of the output signal overshoots the second threshold value; and wherein the undershooting or exceeding of the threshold value is used for diagnosis of the sensor.

2. The method as recited in claim 1, wherein the first threshold value is equal to the second threshold value.

3. The method as recited in claim 1, wherein in the event of undershooting or overshooting of the threshold values, the output signals of the sensor upon restarting of the motor vehicle are initially not used for the control and/or regulation of the motor vehicle.

4. The method as recited in claim 3, wherein the sensor is not used again for the control and/or regulation of the motor vehicle until calibration of the sensor has been done.

5. The method as recited in claim 4, wherein the calibration is done by learning minimum and maximum output values of the sensor.

6. The method as recited in claim 3, wherein starting of the engine in emergency operation is done without using the phase sensor.

7. The method as recited in claim 1, wherein the signal in the controller is stored in a nonvolatile memory so that the signal will be directly available upon restarting of the engine.

8. The method as recited in claim 1, wherein the sensor is a phase sensor on a camshaft of the engine.

9. The method as recited in claim 1, wherein the threshold values are stored in a permanent memory of the sensor.

10. The method as recited in claim 9, that by means of a calibration of the sensor, the threshold values are adapted.

11. The method as recited in claim 1, wherein the forwarding of the signal is done in encoded form.

12. A sensor having means for performing the method of claim 1.

* * * * *